US012078137B1

(12) United States Patent
Schick et al.

(10) Patent No.: US 12,078,137 B1
(45) Date of Patent: Sep. 3, 2024

(54) INJECTOR SLEEVE HAVING INNER GROOVE

(71) Applicant: Caterpillar Inc., Peoria, IL (US)

(72) Inventors: Andrew D. Schick, Edelstein, IL (US); Curtis J. Graham, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/361,280

(22) Filed: Jul. 28, 2023

(51) Int. Cl.
*F02M 61/14* (2006.01)
*F02M 61/16* (2006.01)

(52) U.S. Cl.
CPC .......... *F02M 61/14* (2013.01); *F02M 61/168* (2013.01); *F02M 2200/858* (2013.01)

(58) Field of Classification Search
CPC . F02M 61/14; F02M 61/168; F02M 2200/858
See application file for complete search history.

(56) References Cited

U.S. PATENT DOCUMENTS 5,345,913 A 9/1994 Belshaw et al.
6,019,088 A * 2/2000 Stevens .................. F02M 61/14 123/470
9,827,656 B2 * 11/2017 Whitaker ............ B25B 27/0035
10,648,424 B2 5/2020 Schlee
2013/0042473 A1 * 2/2013 Imam .................... B25B 27/062 29/888.011

FOREIGN PATENT DOCUMENTS

CN 203214217 U 9/2013
KR 100680785 B1 2/2007

* cited by examiner

*Primary Examiner* — Syed O Hasan
(74) *Attorney, Agent, or Firm* — Bookoff McAndrews, PLLC

(57) ABSTRACT

An injector sleeve for a cylinder head may include a lower portion, a middle portion, and an upper portion. The upper portion may have a maximum thickness along at least a portion of a length thereof, and a groove on an inner surface of the injector sleeve. The groove may have an upper planar surface that is normal to a longitudinal axis of the injector sleeve. A related method of removing an injector sleeve from a cylinder head may include inserting a removal tool into the injector sleeve, within the cylinder head, by a predetermined depth, engaging a surface of the removal tool with an upper planar surface of a groove on an inner surface of an upper portion of the injector sleeve, and pulling the removal tool outward from the cylinder head, thereby removing the injector sleeve from the cylinder head.

19 Claims, 5 Drawing Sheets

INJECTOR SLEEVE HAVING INNER GROOVE

TECHNICAL FIELD

The present disclosure relates generally to an injector sleeve for an injector that is inserted into a cylinder head of an engine block, more specifically, to an injector sleeve having an inner groove, and a related method of removing the injector sleeve from the cylinder head.

BACKGROUND

Internal combustion engines use fuel injectors to supply fuel to cylinders of an engine block. To facilitate placement of and to secure the fuel injector within an opening in a cylinder head of the engine block, an injector sleeve is press fit into the opening in the cylinder head, and the fuel injector is then pressed into the injector sleeve. The shape of the injector sleeve, including the location and number of any grooves or other indentations, is limited due to the need for a secure fit between the injector sleeve and the opening in the cylinder head, and the need for a secure fit between the injector sleeve and the fuel injector. Removal of injector sleeves, for replacement as part of routine maintenance for the engine, may require insertion of a removal tool, such as an injector sleeve puller. The injector sleeve puller is inserted into an inner bore of the injector sleeve and is rotated to either cut threads into an inner surface of the injector sleeve, or, if the injector sleeve puller has one or more expanding members, these members expand outward and bite into the inner surface of the injector sleeve, to form and engage with threads on an inner surface of the injector sleeve, and to provide leverage when pulling the injector sleeve puller and injector sleeve out of the cylinder head.

Chinese Utility Model Publication No. 203214217U (the ’217 Publication) describes an ejection tool for removal of a fuel injector sheath from a cylinder head of a diesel engine. The ejection tool has a pawl expander that expands a pawl into an inner wall of a fuel injector sheath, forming a groove therein. A crankshaft of the engine is rotated by manpower to make a piston go up, thrusting an ejector rod of the ejection tool upward, thereby pushing the ejection tool and the fuel injector sheath upward and out of a mounting hole of a cylinder head. The ejection tool of the ’217 Publication is thus a specialized tool for use in removing injector sleeves, and is designed to be inserted deep into the fuel injector sheath during a removal procedure, so that the ejector rod of the ejection tool is exposed to thrust of the piston within the cylinder of the engine.

There is a need, however, for an improved injector sleeve that is removable with standard removal tools. The injector sleeve and the related method for removal of an injector sleeve of the present disclosure may solve one or more of the problems set forth above and/or other problems in the art. The scope of the current disclosure, however, is defined by the attached claims, and not by the ability to solve any specific problem.

SUMMARY

In one aspect, an injector sleeve for a cylinder head may include a lower portion, a middle portion, provided above the lower portion, and an upper portion, provided above the middle portion, the upper portion having a maximum thickness along at least a portion of a length thereof, and having a groove on an inner surface of the injector sleeve, the groove having an upper planar surface that is normal to a longitudinal axis of the injector sleeve.

In another aspect, an injector sleeve for a cylinder head may include a lower portion, a middle portion, provided above the lower portion, and an upper portion, provided above the middle portion, the upper portion having a maximum thickness along at least a portion of a length thereof, and having a groove on an inner surface of the injector sleeve, the groove having a upper planar surface that is normal to a longitudinal axis of the injector sleeve, a depth of the upper planar surface of the groove being about 1 mm to about 2.5 mm, and a distance between an upper end of the upper portion and the upper planar surface of the groove being about 18 mm or less, wherein the injector sleeve is configured for use with a common rail fuel injector.

In still another aspect, a method of removing an injector sleeve from a cylinder head may include inserting a removal tool into the injector sleeve, within the cylinder head, by a predetermined depth of at least about 10 mm, engaging a surface of the removal tool with an upper planar surface of a groove on an inner surface of an upper portion of the injector sleeve, and pulling the removal tool outward from the cylinder head, thereby removing the injector sleeve from the cylinder head.

DETAILED DESCRIPTION

Both the foregoing general description and the following detailed description are exemplary and explanatory only and are not restrictive of the features, as claimed. As used herein, the terms “comprises,” “comprising,” “having,” including,” or other variations thereof, are intended to cover a non-exclusive inclusion, such that a process, method, article, or apparatus that comprises a list of elements does not include only those elements, but may include other elements not expressly listed or inherent to such a process, method, article, or apparatus. Moreover, in this disclosure, relative terms, such as, for example, “about,” “generally, “substantially,” and “approximately” are used to indicate a possible variation of +10% in the stated value.

Figure 1:
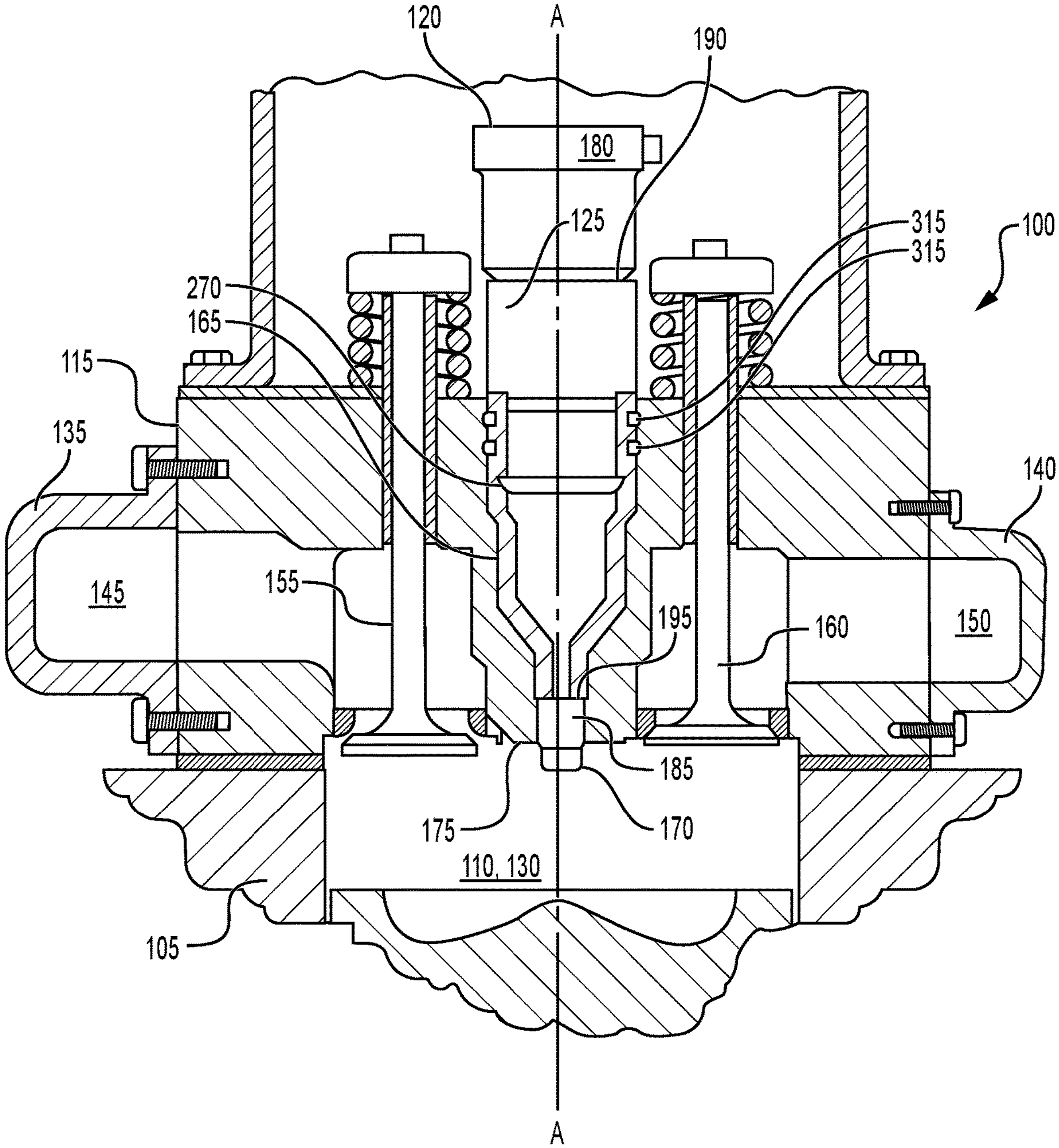
FIG. 1 shows a cross-sectional view of view of a portion of an engine, including an engine block, a cylinder head, a fuel injector, and an injector sleeve, in accordance with the present disclosure.

FIG. 1 shows a cross-sectional view of a portion of an engine 100, including an engine block 105, a cylinder 110, a cylinder head 115, a fuel injector (or simply, injector) 120, and an injector sleeve 125. The cylinder head 115 is mounted on the engine block 105, to form a combustion chamber 130. An intake manifold 135 and an exhaust manifold 140 may be mounted to the cylinder head 115, to form an intake passage 145 and an exhaust passage 150, respectively. An intake valve 155 is provided between the intake passage 145 and the combustion chamber 130, and an exhaust valve 160 is provided between the exhaust passage 150 and the combustion chamber 130. The injector 120 and the injector sleeve 125 are shown positioned within a mounting hole 165 of the cylinder head 115. The injector 120 includes an injector tip 170 that protrudes slightly below a surface 175 of the cylinder head, and into the combustion chamber 130, as shown in FIG. 1.

The injector 120 extends along a longitudinal axis A-A, and has an upper end 180, and a lower end 185 adapted to be inserted into the injector sleeve 125. The injector sleeve 125 also extends along the longitudinal axis A-A, and may be a substantially cylindrical member having open upper end 190 and a relatively more narrow lower end 195, opposite to the upper end 190. The injector tip 170 may be positioned within the injector sleeve 125, such that a portion of the injector tip 170 protrudes from the lower end 195 of the injector sleeve 125. The injector 120 may be press fit into the lower end 195 of the injector sleeve 125.

Figure 2:
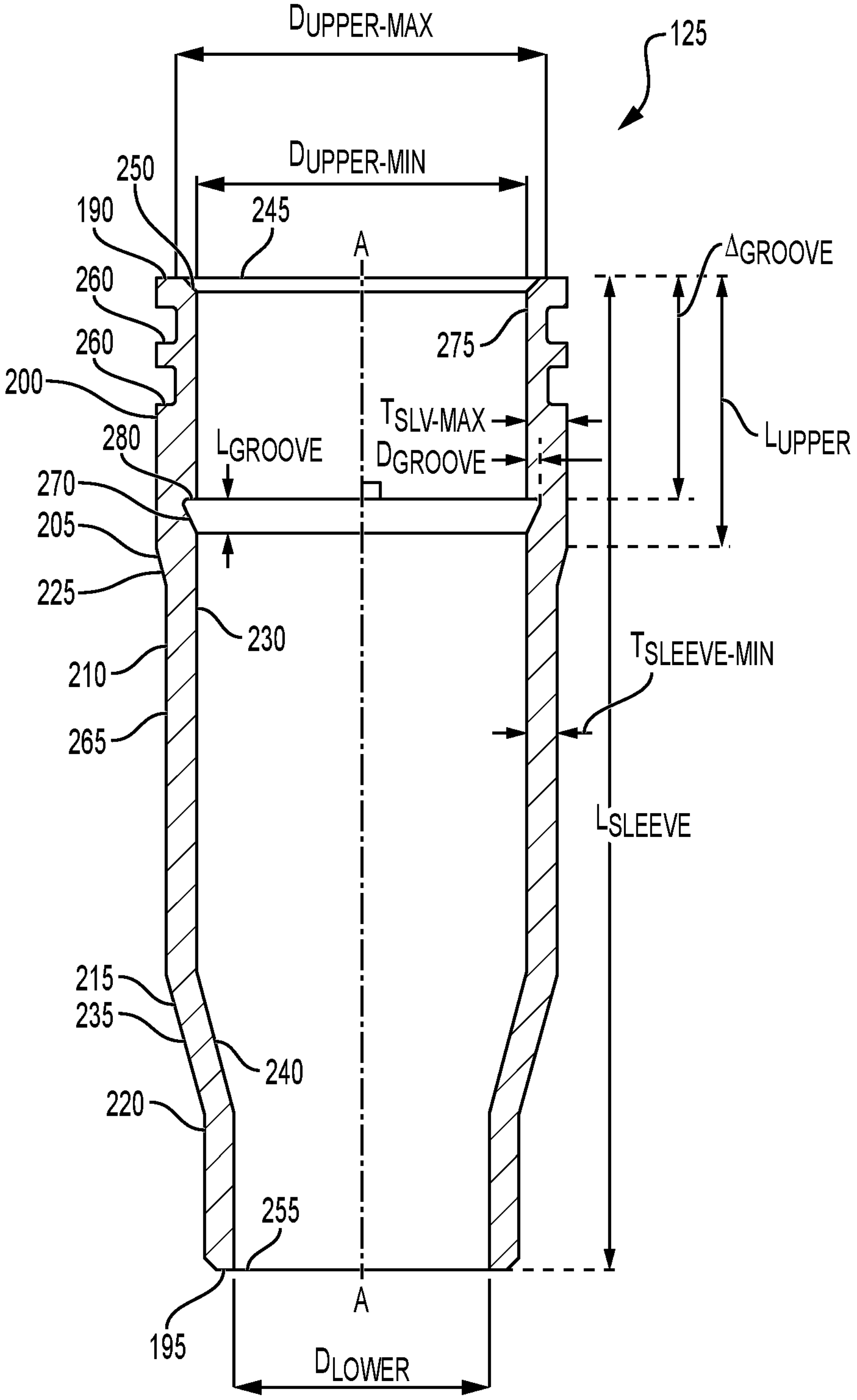
FIG. 2 shows a cross-sectional view of the injector sleeve shown in FIG. 1.

FIG. 2 shows a cross-sectional view of the injector sleeve 125 shown in FIG. 1. The injector sleeve 125 is substantially cylindrical, and includes, in order from the upper end 190 to the lower end 195, an upper portion 200, an upper tapered portion 205, a middle portion 210, a lower tapered portion 215, and a lower portion 220. The outer surfaces and inner surfaces of the middle portion 210 and the lower portion 220 of the sleeve may be non-inclined and free from any grooves or indentations. The upper tapered portion 205 and the lower tapered portion 215 are, as the names suggest, tapered, so as to provide a gradual transition between the upper portion 200 and the middle portion 210 and between the middle portion 210 and the lower portion 220, respectively. One or both of inner surfaces and outer surfaces of the upper tapered portion 205 and the lower tapered portion 215 may extend at an incline, or at an angle relative to the longitudinal axis A-A. In the embodiment shown in FIG. 2, the upper tapered portion 205 may have an inclined outer surface 225, and a non-inclined inner surface 230, and the lower tapered portion 215 may have an inclined outer surface 235 and an inclined inner surface 240.

The upper end 190 has an upper end opening 245, which may have a tapered edge 250. As an example, the upper end opening 245 may have a minimum diameter $D_{UPPER\text{-}MIN}$ and a maximum diameter $D_{UPPER\text{-}MAX}$, as shown in FIG. 2. The minimum diameter $D_{UPPER\text{-}MIN}$ may be about 22 mm±5 mm, and the maximum diameter $D_{UPPER\text{-}MAX}$ may be about 25 mm±5 mm. The lower end 195 has a lower end opening 255 with a diameter $D_{LOWER}$. As an example, $D_{LOWER}$ may be about 17 mm±5 mm.

The upper portion 200 may have a maximum thickness (or maximum sleeve thickness) $T_{SLEEVE\text{-}MAX}$ on at least a portion of a length $L_{UPPER}$ of the upper portion 200, while the middle portion 210, lower tapered portion 215, and/or the lower portion 220 may have a minimum thickness (or minimum sleeve thickness) $T_{SLEEVE\text{-}MIN}$. The upper portion 200 may also include one or more annular external or outer grooves 260 on an outer surface 265 of the injector sleeve 125. In the embodiment shown in FIG. 2, the injector sleeve 125 includes two outer grooves 260. The outer grooves 260 may be adapted to receive sealing rings 315, such that when the injector sleeve 125 is inserted into the mounting hole 165 of the cylinder head 115, a tight seal is formed between the cylinder head 115 and the injector sleeve 125.

The upper portion 200 may also have an inner groove 270 on an inner surface 275 of the injector sleeve 125. The inner groove 270 may have an upper planar surface 280, also shown in FIG. 3, that is normal or approximately normal to the longitudinal axis A-A. The inner groove 270 may be the only groove on the inner surface 275 of the entire injector sleeve 125. In other words, apart from the inner groove 270, the inner surface 275 of the injector sleeve 125 may be free from any other grooves. The inner groove 270 is provided in the portion of the injector sleeve 125 having a greatest thickness, here, the upper portion 200, so that the injector sleeve 125 can withstand the forces acting on the injector sleeve 125 during a removal process. The inner groove 270 may extend 360° around the inner surface 275 of the injector sleeve 125. That is, the inner groove 270 may be an annular groove.

A depth DGROOVE of the inner groove 270 (or inner groove depth), also defined by a depth of the upper planar surface 280, may be selected based on a dimension of a portion of a standard removal tool commonly used for removal of injector sleeves. The inner groove depth DGROOVE may also be less than or equal to the minimum sleeve thickness $T_{SLEEVE\text{-}MIN}$. As an example, the inner groove depth DGROOVE may be about 1 mm. In addition, inner groove depth DGROOVE may be up to about 2.5 mm. An overall length $L_{SLEEVE}$ of the injector sleeve 125 (or injector sleeve length) may be about 67 mm±10 mm, and a length $L_{UPPER}$ of the upper portion 200 (or upper portion length) may be about 17 mm to about 25 mm. The injector sleeve length $L_{SLEEVE}$ may be determined based on a size of the cylinder head 115, in order to preserve a cooling performance of the cylinder head 115. A distance $\Delta_{GROOVE}$ between the inner groove 270 and the upper end 190 of the injector sleeve 125 may be less than about 18 mm. In one embodiment, the distance $\Delta_{GROOVE}$ may be between about 10 mm and about 18 mm. In one particular example, distance $\Delta_{GROOVE}$ may be about 15 mm. In addition, a length $L_{GROOVE}$ of the inner groove 270 (or inner groove length) may be in a range of about 2 mm to about 4 mm, and in particular, for example, may be about 2.25 mm. The dimensions of the injector sleeve 125 may be selected so that the injector sleeve can be used with common rail fuel injectors.

Figure 3:
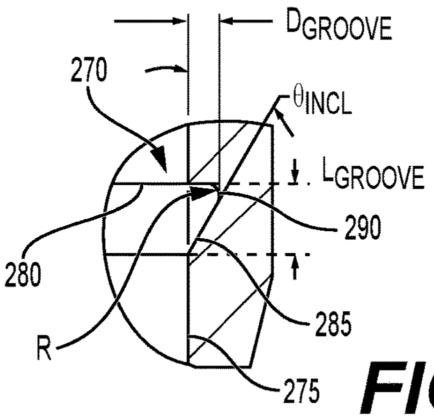
FIG. 3 shows a detailed cross-sectional view of a portion of a groove of the injector sleeve shown in FIGS. 1 and 2.

FIG. 3 shows a detail cross-sectional view of a portion of the inner groove 270 of the injector sleeve 125 shown in FIGS. 1 and 2. In particular, FIG. 3 shows the inner groove depth DGROOVE, defined along the upper planar surface 280 of the inner groove 270. The inner groove 270 may also include an inclined surface 285, extending outward from the inner surface 275 of the injector sleeve 125, to the upper planar surface 280 of the inner groove 270. The inclined surface 285 may be a planar inclined surface, and may be at an angle $\theta_{INCL}$, relative to the inner surface 275 of the injector sleeve 125, in a range of about 20° to about 40°. As an example, the angle $\theta_{INCL}$ may be about 30°. A rounded corner 290 extends between the inclined surface 285 and the upper planar surface 280, or, in other words, the inclined surface 285 and the upper planar surface 280 meet at the rounded corner 290. A radius of curvature of the rounded corner may be about 4 mm, as an example.

The injector sleeve 125 may be formed of a suitable material to withstand high temperatures, as the area of the cylinder head 115 in which the injector 120 is positioned may endure relatively high heat (that is, it may be a hot spot). The material of the injector sleeve 125 may have cooling properties such that it can cool the injector 120 and/or other nearby components. For example, the injector sleeve 125 may be formed of steel. As another example, the injector sleeve 125 may be formed of heat-treated steel. The inner groove 270 may be formed in the inner surface 275 of the injector sleeve 125 using a lathe, for example.

Figure 4:
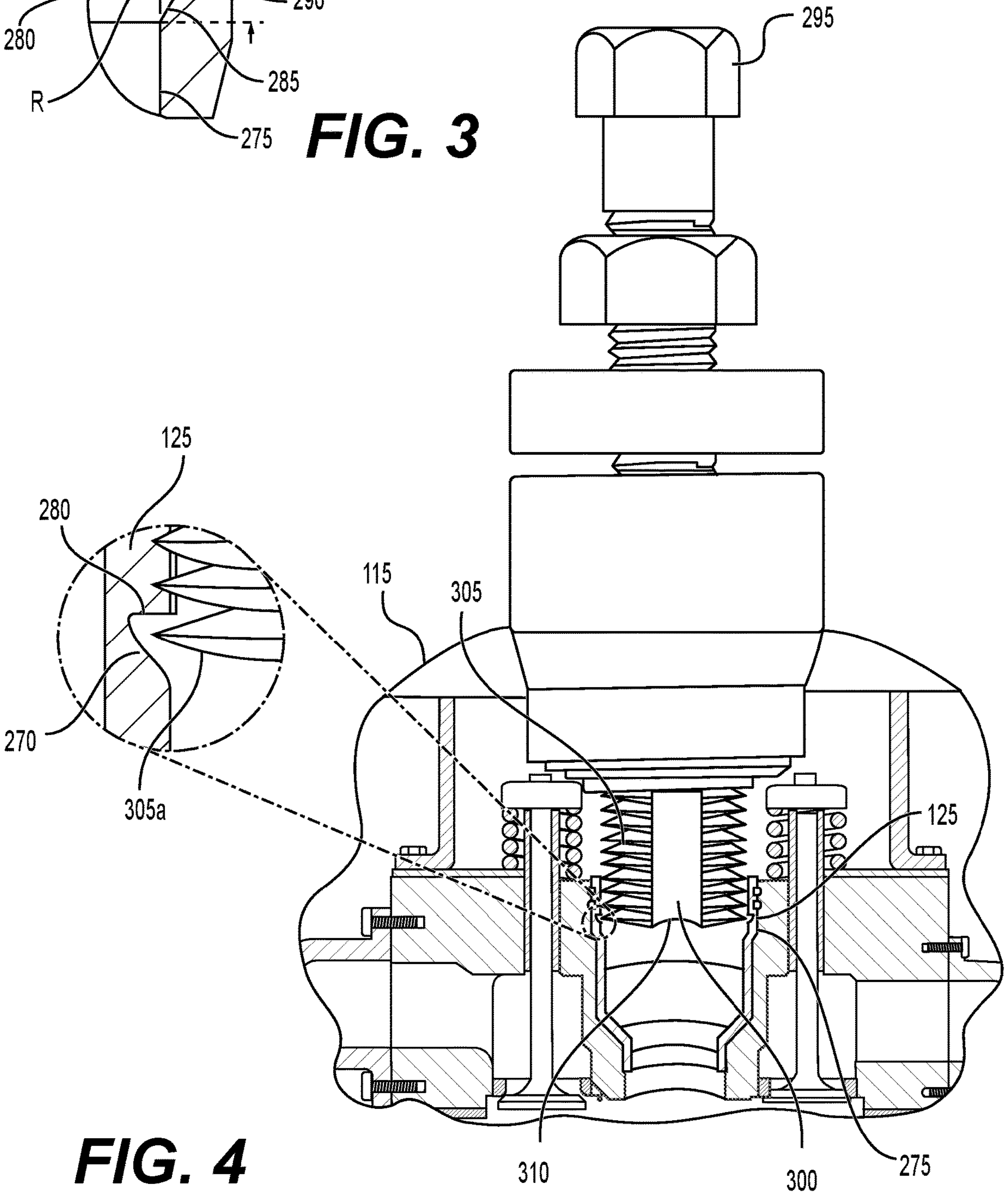
FIG. 4 shows a partial cross-sectional view of a removal tool and the injector sleeve shown in FIGS. 1 to 3, in accordance with the present disclosure.

FIG. 4 shows a partial cross-sectional view of a tap-type removal tool 295 and the injector sleeve 125 shown in FIGS. 1 to 3. The tap-type removal tool 295 shown in FIG. 4 is detailed in U.S. Pat. No. 9,827,656, and is one example of a removal tool, although other removal tools may be used to remove the injector sleeve 125 of the present disclosure. As shown in FIG. 4, a tap 300 of the tap-type removal tool 295 is inserted into the upper portion 200 of the injector sleeve 125, which is located within the mounting hole 165 of the cylinder head 115. The tap-type removal tool 295 includes a plurality of threads 305 provided on a distal end 310 thereof. As discussed in more detail below with respect to a method for removal of the injector sleeve 125, as the tap 300 of the tap-type removal tool 295 is rotated, a thread 305*a*, of the plurality of threads 305 on the distal end 310 of the tap 300, engages with or contacts the inner groove 270 on the inner surface 275 of the injector sleeve 125. More specifically, as one example, a distalmost thread 305*a*, of the plurality of threads 305 provided on the tap 300, may be engaged with or contact at least the upper planar surface 280 of the inner groove 270, as shown in the detail view of FIG. 4. Then, by pulling the tap-type removal tool 295 upward and out of the opening of the cylinder head 115, the injector sleeve 125 is pulled out of the opening of the cylinder head 115.

Figures 5A, 5B, 5C:
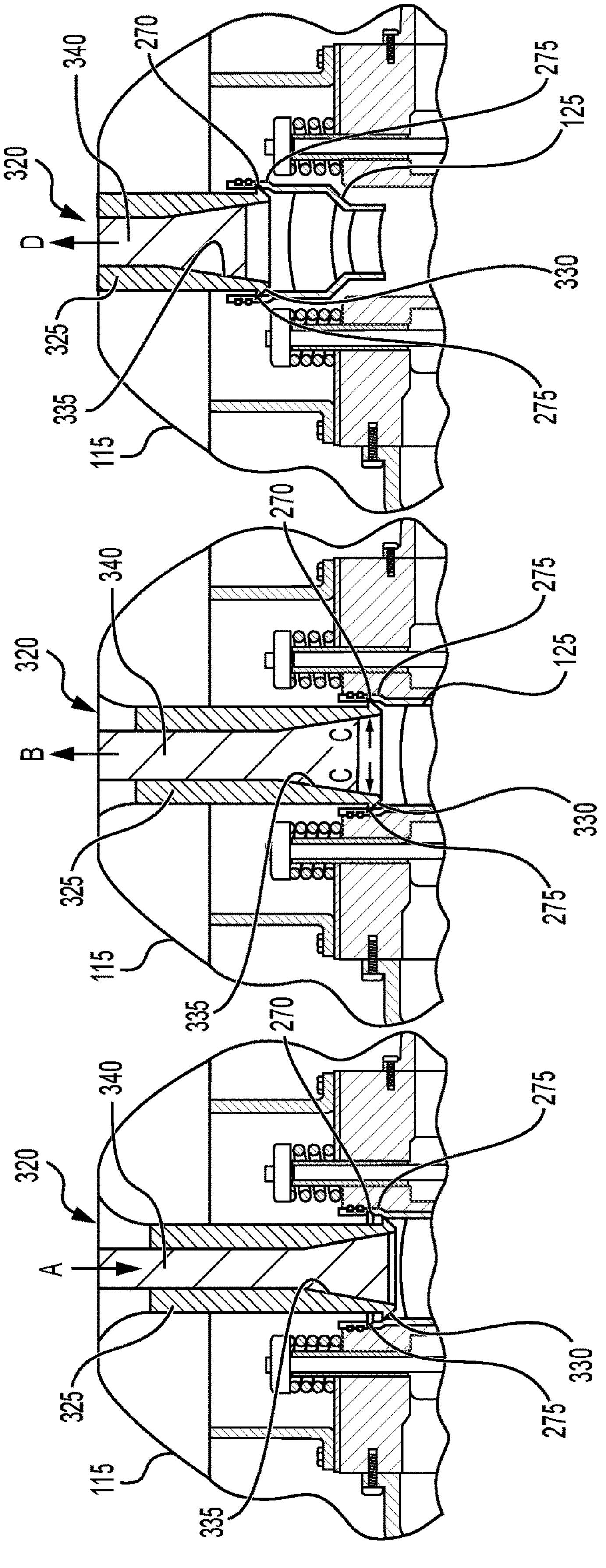
FIG. 5A, FIG. 5B, and FIG. 5C show partial cross-sectional views of another removal tool and the injector sleeve shown in FIGS. 1 to 3, during a removal process, in according with the present disclosure.

FIG. 5A, FIG. 5B, and FIG. 5C show partial cross-sectional views of a mandrel type removal tool 320, as an alternative to the tap-type removal tool 295 shown in FIG. 4, during a removal process of the injector sleeve 125 shown in FIG. 1 and FIG. 3. The mandrel type removal tool 320 may be used to remove an injector sleeve 125. In particular, FIG. 5A shows insertion of the mandrel type removal tool 320 into the injector sleeve 125 in the direction of arrow. The mandrel type removal tool 320 has an outer tube 325 having a radially extending triangular protrusion 330 at a distal end thereof, and an inner tapered bore 335 that receives an actuation member 340. The actuation member 340 is tapered at a distal end thereof, so that movement, or retraction, of the actuation member 340, in an upward direction, shown by arrow B in FIG. 5B, causes the outer tube 325 to move upward and the radially extending triangular protrusion 330 to expand outward, shown by arrows C, into the groove 270 of the injector sleeve 125. FIG. 5B shows retraction of the actuation member 340, relative to the outer tube 325 of the mandrel type removal tool 320, thereby expanding the radially extending triangular protrusion 330 at the distal end of the outer tube 325. FIG. 5C shows movement, or retraction, of the outer tube 325 and the actuation member 340, as well as the injector sleeve 125, in an upward direction, shown by arrow D, out of the mounting hole 165 of the cylinder head 115.

Other types of removal tools may be used to remove the injector sleeve 125. For example, another mandrel type remove tool may be inserted into the injector sleeve 125, and a mechanism, such as a screw or a lever, on a head of the removal tool may be applied to expand one or more end effectors, such as grippers. The end effectors may be spring-biased or may operate by use of a hydraulic mechanism, and are operable to expand outward to engage the inner groove 270 of the injector sleeve 125. Then, by pulling the mandrel type removal tool upward and out of the mounting hole 165 of the cylinder head 115, the injector sleeve 125 is pulled out of the cylinder head 115.

INDUSTRIAL APPLICABILITY

The injector sleeve 125 of the present disclosure is configured for use with common rail fuel injectors, and can be easily removed from a cylinder head 115 using available removal tools.

Figure 6:
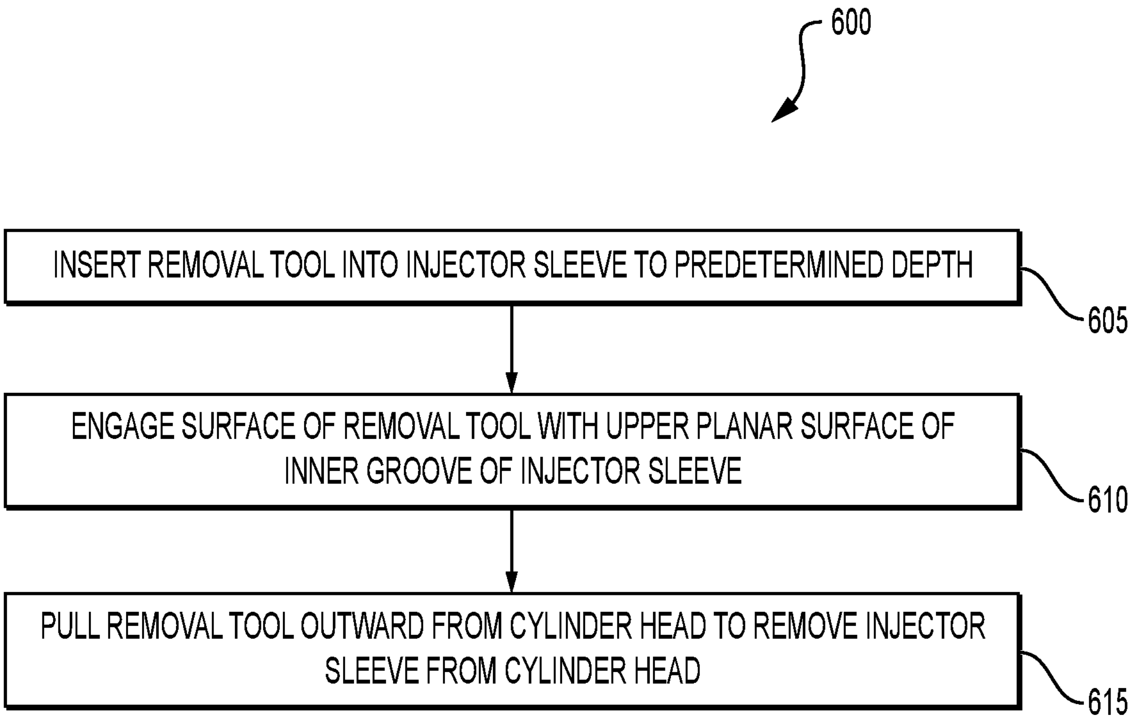
FIG. 6 shows a flow chart of a method for removing an injector sleeve, in accordance with the present disclosure.

FIG. 6 shows a flowchart of a method 600 for removal of an injector sleeve 125, in accordance with the present disclosure. The method 600 may include a step 605 of inserting the tap-type removal tool 295 or the mandrel type removal tool 320 into the injector sleeve 125 to a predetermined depth or predetermined distance. The predetermined depth or predetermined distance may be the distance between the inner groove 270 and the upper end 190 of the injector sleeve 125, or distance $\Delta_{GROOVE}$. FIG. 5A shows insertion of the mandrel type removal tool 320 into the injector sleeve 125, in the direction of arrow A, as an example of step 605.

The method 600 may also include a step 610 of engaging a surface of the tap-type removal tool 295 or of the mandrel type removal tool 320 (e.g., the radially extending triangular protrusion 330) with one or both of the upper planar surface 280 or the inclined surface 285 of the inner groove 270 of the injector sleeve 125. For example, if the tap-type removal tool 295 has a tap 300 with a plurality of threads 305 on a distal end 310 of the tap 300, step 610 may include engaging a thread 305*a*, of the plurality of threads 305, with the upper planar surface 280 of the inner groove 270. More specifically, a distalmost thread 305*a*, of the plurality of threads 305 provided on the tap 300, may be engaged with the upper planar surface 280 of the inner groove 270. And, in a case in which the mandrel type removal tool 320 is used, step 610 may include retracting the actuation member 340 of the mandrel type removal tool 320 within the outer tube 325, in the direction of arrow B in FIG. 5B, to outwardly expand the radially extending triangular protrusion 330 of the outer tube 325 in the direction of arrows C, that is, in a radially outward direction from a central axis of the mandrel type removal tool 320. The radially extending triangular protrusion 330 may then engage with the upper planar surface 280 of the inner groove 270.

Further, the method 600 may include a step 615 of pulling or retracting the tap-type removal tool 295 or the mandrel type removal tool 320 outward from the cylinder head 115, thereby removing the injector sleeve 125 from the cylinder head 115. FIG. 5C shows, as an example, pulling of the mandrel type removal tool 320 in an upward direction, shown by arrow D, to remove the removal tool 320 and the injector sleeve 125 from the mounting hole 165 of the cylinder head 115.

Although the method 600 is described as including steps 605 to 615, additional steps may be included as part of the method. For example, the method 600 may include an initial step of removing the injector 120, and/or additional steps of cleaning the mounting hole 165 of the cylinder head 115 after removal of the injector sleeve 125, and insertion of a replacement injector sleeve.

As noted above, the injector sleeve 125 of the present disclosure is relatively easy to remove using commonly owned and used removal tools, while maintaining sufficient thickness and strength to endure stress during a removal process and remaining compatible with commonly used rail injectors. In particular, by virtue of the inner groove 270 on the upper portion 200 of the injector sleeve 125, a standard removal tool, such as the tap-type removal tool 295 or the mandrel type removal tool 320, may be inserted into the injector sleeve 125, so that a portion of the removal tool engages with or contacts the inner groove 270 of the injector sleeve 125, and the removal tool and injector sleeve 125 can easily be pulled out from the cylinder head 115. More specifically, the shape of the inner groove 270, including the inner groove depth DGROOVE, the rounded corner with the radius of curvature R, and the length of the groove $L_{GROOVE}$, are sized to be compatible with portions of commonly used removal tools. Thus, the injector sleeve 125 of the present disclosure does not require a specialized tool for removal.

Further, by virtue of the inner groove 270 being provided in the upper portion 200 of the injector sleeve 125, at a predetermined depth or predetermined distance $\Delta_{GROOVE}$ into the injector sleeve 125, a removal tool, such as the tap-type removal tool 295 or the mandrel type removal tool 320, does not require relatively deep insertion, making the removal process easier and less time consuming. That is, the removal tool need only be inserted until a distal end, such as a distalmost thread 305*a* of the tap-type removal tool 295 or the radially extending triangular protrusion 325 of the mandrel type removal tool 320 engages with or contacts the inner groove 270, rather than having to be inserted deep enough engage with a lower end, or a distal end, of the injector sleeve 125. By virtue of the inner groove 270 being formed within the thickest portion of the injector sleeve 125, the injector sleeve 125 maintains sufficient strength with withstand stress forces acting upon the injector sleeve 125 during the removal process. In addition, because threads 305 of the tap-type removal tool 295 do not need to form as many, or any, threads on the inner surface 275 of the injector sleeve 125, needing to only engage the inner groove 270, insertion of the removal tool 295 and engagement with the inner groove 270 requires relatively less manpower and time. And, because threads do not need to be formed on the inner surface 275 of the injector sleeve 125, minimal or no debris is generated, thus reducing the risk of debris entering the cylinder 110 as a result of the removal process.

It will be apparent to those skilled in the art that various modifications and variations can be made to the disclosed injector sleeve and related method for removal, without departing from the scope of the disclosure. Other embodiments of the injector sleeve and the related method for removal will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

We claim:

1. An injector sleeve for a cylinder head, the injector sleeve comprising:

a lower portion, a middle portion, provided above the lower portion; and an upper portion, provided above the middle portion, the upper portion having a maximum thickness along at least a portion of a length thereof, and having a groove on an inner surface of the injector sleeve, the groove having an upper planar surface that is normal to a longitudinal axis of the injector sleeve, and having a maximum groove depth along the upper planar surface, the maximum groove depth of the upper planar surface of the groove being about 1 mm to about 2.5 mm, and a distance between an upper end of the upper portion and the upper planar surface of the groove being about 18 mm or less, wherein the injector sleeve is configured for use with a fuel injector.

2. The injector sleeve according to claim 1, wherein the groove is the only groove on an inner surface of the injector sleeve.

3. The injector sleeve according to claim 1, wherein the groove extends 360° around an inner surface of the injector sleeve.

4. The injector sleeve according to claim 1, wherein the groove further has an inclined planar surface that is at an angle of about 20° to about 40° relative to the longitudinal axis of the injector sleeve.

5. The injector sleeve according to claim 4, wherein a corner at which the upper planar surface of the groove and the inclined planar surface meet is a rounded corner.

6. The injector sleeve according to claim 5, wherein a radius of curvature of the rounded corner is about 4 mm.

7. The injector sleeve according to claim 1, wherein a depth of the groove, into a thickness of the upper portion of the injector sleeve, is about 1 mm.

8. The injector sleeve according to claim 1, wherein the injector sleeve is further configured for use with a common rail fuel injector.

9. An injector sleeve for a cylinder head, the injector sleeve comprising:

a lower portion, a middle portion, provided above the lower portion; and an upper portion, provided above the middle portion, the upper portion having a maximum thickness along at least a portion of a length thereof, and having a groove on an inner surface of the injector sleeve, the groove having an upper planar surface that is normal to a longitudinal axis of the injector sleeve, wherein the groove further has an inclined planar surface that is at an angle of about 20° to about 40° relative to the longitudinal axis of the injector sleeve, wherein a corner at which the upper planar surface of the groove and the inclined planar surface meet is a rounded corner, and wherein a radius of curvature of the rounded corner is about 4 mm.

10. The injector sleeve according to claim 9, wherein the groove is the only groove on an inner surface of the injector sleeve.

11. The injector sleeve according to claim 9, wherein the groove extends 360° around an inner surface of the injector sleeve.

12. The injector sleeve according to claim 9, wherein a depth of the groove, into a thickness of the upper portion of the injector sleeve, is about 1 mm.

13. The injector sleeve according to claim 9, wherein the injector sleeve is further configured for use with a common rail fuel injector.

14. An injector sleeve for a cylinder head, the injector sleeve comprising:

a lower portion, a middle portion, provided above the lower portion; and an upper portion, provided above the middle portion, the upper portion having a maximum thickness along at least a portion of a length thereof, and having a groove on an inner surface of the injector sleeve, the groove having an upper planar surface that is normal to a longitudinal axis of the injector sleeve, a depth of the upper planar surface of the groove being about 1 mm to about 2.5 mm, and a distance between an upper end of the upper portion and the upper planar surface of the groove being about 18 mm or less, wherein the injector sleeve is configured for use with a fuel injector, and wherein a corner at which the upper planar surface of the groove and the inclined planar surface meet is a rounded corner.

15. The injector sleeve according to claim 14, wherein the groove is the only groove on an inner surface of the injector sleeve.

16. The injector sleeve according to claim 14, wherein the groove extends 360° around an inner surface of the injector sleeve.

17. The injector sleeve according to claim 14, wherein the groove further has an inclined planar surface that is at an angle of about 20° to about 40° relative to the longitudinal axis of the injector sleeve.

18. The injector sleeve according to claim 14, wherein a radius of curvature of the rounded corner is about 4 mm.

19. The injector sleeve according to claim 14, wherein the injector sleeve is further configured for use with a common rail fuel injector.

* * * * *